Fig. 1a

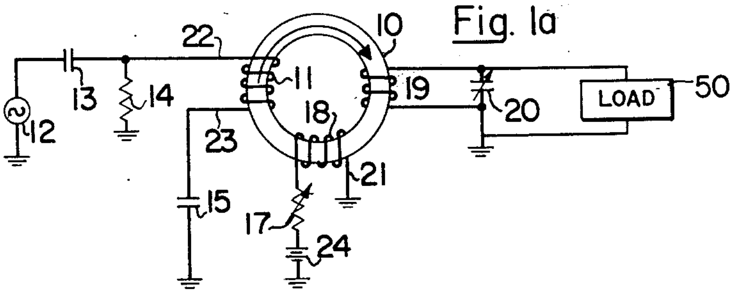

Fig. 2
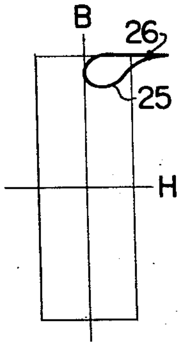

Fig. 3
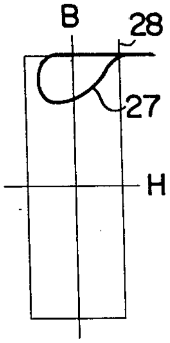

Fig. 4
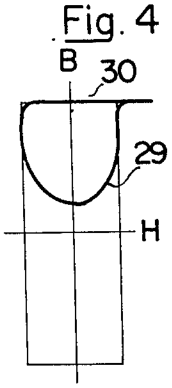

Fig. 5
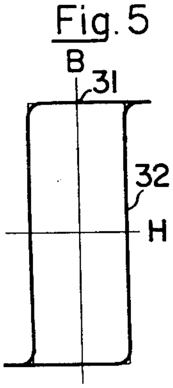

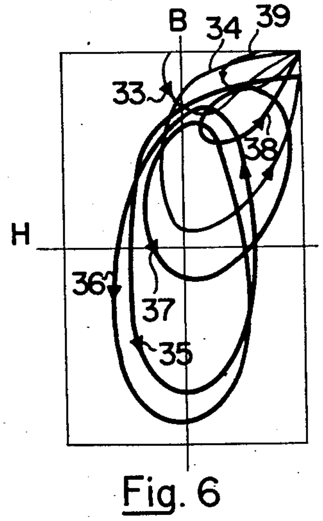

Fig. 6

A.C. FREQUENCY 1.3 MEGACYCLES
A.C. WINDING 600 TURNS
D.C. WINDING 400 TURNS

A.C. AMPLITUDE
SUBHARMONIC OUTPUT
(R.M.S. VOLTS)

| D.C. BIAS (MA) | 35 No. OF STEPS UP | 35 No. OF STEPS DOWN | 35 SUBH AMP (PEAK) | 30 No. OF STEPS UP | 30 No. OF STEPS DOWN | 30 SUBH AMP (PEAK) | 20 No. OF STEPS UP | 20 No. OF STEPS DOWN | 20 SUBH AMP (PEAK) | 15 No. OF STEPS UP | 15 No. OF STEPS DOWN | 15 SUBH AMP (PEAK) | 10 No. OF STEPS UP | 10 No. OF STEPS DOWN | 10 SUBH AMP (PEAK) |
|---|---|---|---|---|---|---|---|---|---|---|---|---|---|---|---|
| 10.0 | 5 | 2 | 65 | 5 | 2 | 65 | 4 | 2 | 50 | 4 | 2 | 35 | 3 | 2 | 25 |
| 7.0 | 7 | 2 | 65 | 6 | 2 | 60 | 5 | 2 | 55 | 4 | 2 | 35 | 3 | 3 | 25 |
| 5.2 | 7 | 3 | 55 | 7 | 3 | 55 | 6 | 2 | 45 | 5 | 2 | 40 | 4 | 2 | 25 |
| 4.2 | 9 | 3 | 50 | 8 | 3 | 50 | 6 | 2 | 45 | 6 | 2 | 35 | 4 | 3 | 25 |
| 2.0 | 10 | 3 | 35 | 9 | 3 | 35 | 8 | 3 | 30 | 6 | 3 | 20 | 4 | 3 | 10 |
| 1.0 | 10 | 3 | 20 | 9 | 3 | 15 | | | | | | | | | |

Fig. 10

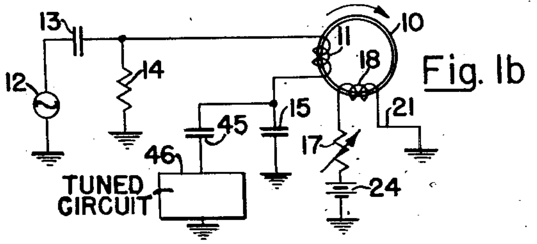

Fig. 1b

INVENTOR
SHOU-HSIEN CHOW
BY
Donald W. Phillion
ATTORNEY

INVENTOR
SHOU-HSIEN CHOW
BY
Donald W. Phillion
ATTORNEY

United States Patent Office 2,794,164

Patented May 28, 1957

2,794,164

MAGNETIC DEVICE

Shou-Hsien Chow, Philadelphia, Pa., assignor to Burroughs Corporation, Detroit, Mich., a corporation of Michigan Application February 20, 1953, Serial No. 337,993

7 Claims. (Cl. 321—68)

This invention relates generally to generator circuits and more particularly to magnetic subharmonic generator devices.

There are, in the prior art, various types of subharmonic generators utilizing electron discharge devices as the means for obtaining subharmonic frequencies. Such devices usually have the characteristics of high speed but also present problems of changing operating characteristics with age and use. A subharmonic frequency generator having as its basic element a magnetic core will maintain substantially constant operating characteristics with age and use. Further, the packing space and power necessary to operate the magnetic subharmonic generator disclosed herein will be smaller than that required for an electron discharge device type subharmonic generator.

An object of the present invention is to provide a subharmonic frequency generator utilizing a magnetic core element.

Another object is a subharmonic frequency generator whose operating characteristics will not alter appreciably with age and use.

A third object of the invention is a subharmonic frequency generator capable of generating subharmonic frequencies in a continuously varying range from approximately one sixth the fundamental frequency to approximately one fiftieth the fundamental frequency.

A further object of the invention is to improve subharmonic frequency generators generally.

In accordance with one embodiment of the invention there is comprised a magnetic core having a first winding means wound thereon. A capacitor is connected to one terminal of the first winding means. An alternating current input source is connected across the series combination of the first winding means and the capacitor. A second winding means is also wound on said magnetic core. Said second winding means has connected across its terminals a substantially constant unilateral voltage source adapted to create a magnetic flux bias condition in said magnetic core. Subharmonic frequencies can be detected either by means of a load circuit such as a tuned circuit connected across the said capacitor or by means of a third winding wound around said magnetic core. The charge on said capacitor will vary cyclically in accordance with circuit constants to produce subharmonic frequencies thereacross.

In accordance with one feature of the invention, the magnetic core is made of very thin magnetic material having a substantially square wave hysteresis loop. In a complete cycle of the alternating current input the current flow during one-half of the cycle is larger than the current flow during the other half cycle since, as will be described in more detail hereinafter, the different slopes of the minor hysteresis loops represent different inductive values of the said first winding means.

These and other objects and features of the invention will become more fully understood from the following detailed description when read in conjunction with the drawings, in which:

Fig. 1*a* is a schematic showing of an embodiment of the invention depicting one type of output circuit utilized in the practice of the invention; and Fig. 1*b* is another embodiment of the invention shown in Fig. 1*a* setting out another output circuit that may be utilized with the invention;

Figs. 2, 3, 4, and 5 are illustrations of the hysteresis loop of the magnetic material at different values of bias;

Fig. 6 shows a series of curves of minor hysteresis loops in one subharmonic cycle;

Fig. 10 is a chart showing the relationship between input voltage amplitude, the direct current bias, and the subharmonic frequency output.

Figure 7:
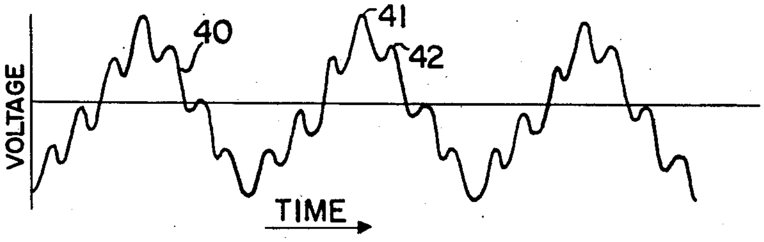
Fig. 7 is a curve of a subharmonic output.

Referring now to Fig. 1*a*, magnetic core 10 may be composed of ten wraps of 0.000125 of an inch thick molypermalloy core material and having as its overall dimensions a diameter of 0.375 inch and a width of 0.125 inch. Molypermalloy is an alloy comprised of molybdenum, nickel, and iron. It has a characteristic hysteresis curve substantially rectangular in shape. Other magnetic materials can also be used even though their characteristic hysteresis curves are not substantially rectangularly shaped. Input winding 11 has 600 turns in the preferred embodiment. Capacitor 15 has a value of 270 micromicrofarads and connects terminal 23 of winding 11 to ground potential. Alternating current input source 12 has one terminal connected to ground potential and the other terminal connected to a first plate of 3000 micromicrofarad capacitor 13. The other plate of capacitor 13 is connected to terminal 22 of winding 11. 500 ohm resistance 14 is connected from said terminal 22 of winding 11 to ground potential. Winding 18, in the preferred embodiment shown herein, is composed of about 400 turns. The series combination of a variable resistance 17 having a range from 10,000 ohms to 100,000 ohms and 100 volt direct current battery source 24 is connected across the terminals of winding 18.

The output may be detected by means of 400 turns output winding 19 which has tuning capacitor 20 having a range of from 50 micromicrofarads to 250 micromicrofarads connected across its terminals. Utilization load 50 is connected across the capacitance 20.

In the operation of the structure shown in Fig. 1*a* assume that an alternating current is caused to pass through winding 11 from alternating current source 12. The magnetic core 10 is originally biased slightly beyond cutoff as at point 26 in Fig. 2. As the first alternating current cycle flows through the winding 11, the current flow during the negative half cycle thereof is smaller than the current flow during the positive half cycle because of the different slopes of the minor loop hysteresis characteristics which represent different inductance values of the winding 11. This difference of inductance values may be seen from an examination of Figs. 2, 3, 4, and 5. The difference of current through winding 11 during negative half cycles and positive half cycles builds up a positive charge on capacitor 15 and effectively decreases the unilateral magnetic flux bias created by winding 18 and battery source 24. Fig. 3 illustrates how the overall direct current bias has been moved to point 28 on curve 27 as compared with point 26 on curve 25 of Fig. 2 after a small positive charge has been placed on capacitor 15. Fig. 4 shows the bias point 30 on curve 29 moved to the left a little more and Fig. 5 shows the bias point 31 on curve 32 approximately at zero point when the charge on capacitor 15 of Fig. 1*a* is great enough to cause a discharge current therethrough, said discharge current times the number of turns of winding 11 being substantially equal to the current through winding 18 times the number of turns of winding 18.

Thus, it can be seen that progressive cycles of alternating current input will traverse different minor hysteresis loops. While the charge on the capacitor 15 tends to be discharged through the combined impedance of resistance 14 and the internal impedance of the alternating current source 12, the rate of accumulating charge is higher than the discharge, thus continuously decreasing the effective unilateral magnetic flux bias caused by winding 18 and battery source 24 until the overall bias is zero or slightly negative. Then the discharging action of capacitor 15 dominates and the effective or overall unilateral magnetic flux bias restores to the original condition after a few alternating current cycles, and the subharmonic cycle starts over again.

Referring to Fig. 6, the minor hysteresis loops traversed by successive alternating current cycles to create one subharmonic cycle are respectively identified by reference characters 33, 34, 35, 36, 37, 38, and 39.

Fig. 1*b* depicts an alternate output circuit wherein no additional output winding on core 10 is required. Such alternate circuit includes an output lead 16 which is coupled to a tuned circuit 46 through a coupling capacitor 45 wherein the discharge path of capacitor 15 is through the tuned circuit 46. Either tuned output circuit 46 of Fig. 1*b* or that of Fig. 1*a* is adjusted so that a subharmonic frequency of the input alternating current source 12 frequency is detected at either of the output circuits shown in Figs. 1*a* and 1*b*.

In Fig. 7 the number of steps up is governed by the charging of the capacitor 15 by the alternating current source 12, and the number of steps down is governed by the discharging of current by the capacitor 15 through the combined impedance of resistance 14 and the internal impedance of the alternating current source 12. They can be adjusted to be the same if so desired. The fundamental frequency ripples can be filtered out by a low pass filter.

Figure 8:
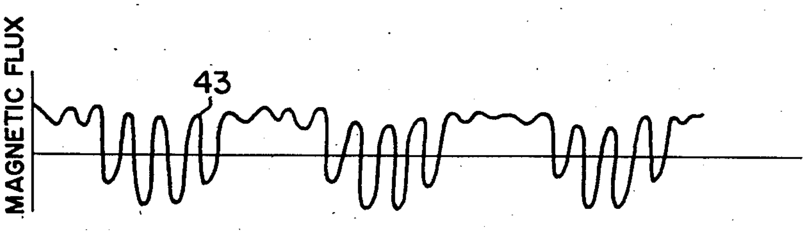
Fig. 8 is a curve of the magnetic flux waveform of the magnetic core when subharmonic frequencies are being generated.
Figure 9:
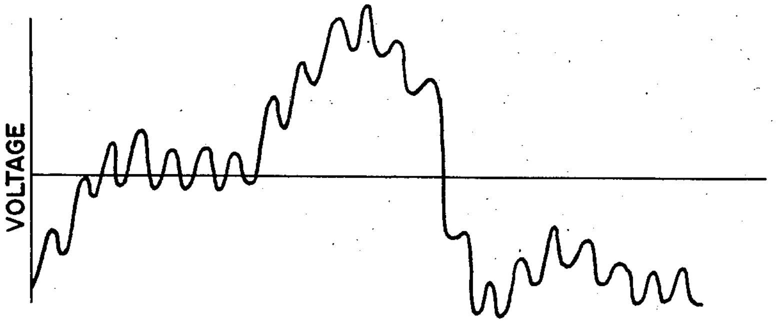
Fig. 9 shows a curve of a sub-subharmonic output.

When the output is tuned to the sub-subharmonic frequency by parallel tuning of the capacitance 20 of the magnetic core, the sub-subharmonic waveform is as shown in Fig. 9 as indicated hereinbefore. The corresponding magnetic flux as observed through an integrating circuit (not shown in the drawings) is shown in Fig. 8.

It is to be observed that subharmonic cycles of Figs. 7, 8, and 9 show considerable similarity in waveform. It is because of the different slopes of the magnetic minor hysteresis loops that a large sub-subharmonic ouput of approximately the same order of magnitude as the subharmonic amplitude can be obtained.

In the preferred embodiment of the invention described herein the upper frequency range of the alternating current input is about 1.5 megacycles. Subharmonics of one-sixth to one-thirteenth of the fundamental alternating current are obtainable. Sub-subharmonic frequencies with a cycle which repeats after three subharmonic cycles are also obtainable. Thus, this embodiment of the invention can be adjusted to give an output in a frequency range extending from one-sixth to one-thirty-ninth of the fundamental frequency.

Referring now to Fig. 10 an examination of the chart therein will show how the amplitude of the subharmonic frequency and the number of fundamental frequency cycles will vary with different combinations of applied alternating current amplitudes and applied direct current bias to winding 18. This chart is unique with the particular structure shown in Fig. 1*a*. The A. C. winding designated on the chart is winding 11 of Fig. 1*a* and the D. C. winding is winding 18.

It is to be noted that the invention described herein is but a preferred embodiment of the same and that various changes may be made in sizes, shapes, materials, and circuit constants without departing from the spirit or scope of the invention.

What is claimed is:

1. A magnetic subharmonic generator comprising a single magnetic core having a substantially square hysteresis loop and further comprising a first winding means wound on said magnetic core, capacitor means connected in series with said first winding means and forming with the latter a charging and discharging path, an alternating current source in series with said capacitor and first winding means and providing the energy for charging said capacitor, resistive means shunting said first winding means and said capacitor and lying in the discharge path for said capacitor, and means inductively coupled to said magnetic core for creating a biasing magnetic flux in said magnetic core.

2. A magnetic subharmonic generator in accordance with claim 1 comprising output means, said output means comprising a second winding means wound around said magnetic core and second capacitor means connected across the terminals of said second winding, said second winding and said second capacitor means forming a tunable circuit adaptable to detect subharmonic frequencies generated in the magnetic flux of said magnetic core.

3. In a magnetic generator comprising a single magnetic core having a substantially square hysteresis loop and further comprising a first winding means wound on said magnetic core, a capacitor connected in series with said first winding means and forming with the latter a charging and discharging path, an alternating current source in series with said capacitor and first winding means and providing the energy for charging said capacitor, resistive means shunting said first winding means and said capacitor and lying in the discharge path for said capacitor, means coupled to said magnetic core for creating a biasing magnetic flux of one polarity in said magnetic core, and output means for sensing the change in magnetic flux polarity produced in said core when said capacitor discharges through said first winding means.

4. In a magnetic generating device of the kind defined in claim 3 wherein said output means comprises a third winding inductively wound on said core and a variable capacitance coupled thereto, said variable capacitance being adjustable to tune said output circuit to a subharmonic frequency of said alternating current source.

5. In a magnetic generating device of the kind defined in claim 3 wherein said output means comprises a tuned circuit connected across said capacitor, said tuned circuit being tuned to a subharmonic frequency of said alternating current source.

6. In a magnetic generating device, a single magnetic core having a substantially square hysteresis loop characteristic, a first winding means wound around said magnetic core, capacitor means connected in series with said first winding means, an impedance means connected to the series combination of said first winding means and capacitor means and forming with said first winding means and capacitor means a charging and discharging path, an alternating current source connected across the series combination of said first winding means and said capacitor means, a second winding means wound around said magnetic core, and a D. C. voltage source adapted to energize said second winding means for creating a biasing magnetic flux field in said core, whereby said capacitor becomes cyclically charged and discharged at a predeterminable frequency subharmonic to the frequency of said alternating current.

7. A magnetic generating device as defined in claim 6 wherein said means for creating a biasing magnetic flux field is made variable.

References Cited in the file of this patent

UNITED STATES PATENTS

| | | |
|---|---|---|
| 1,862,211 | Dowling | June 7, 1932 |
| 2,150,386 | Manley | Mar. 14, 1939 |
| 2,265,296 | Lee | Dec. 9, 1941 |